UNITED STATES PATENT OFFICE.

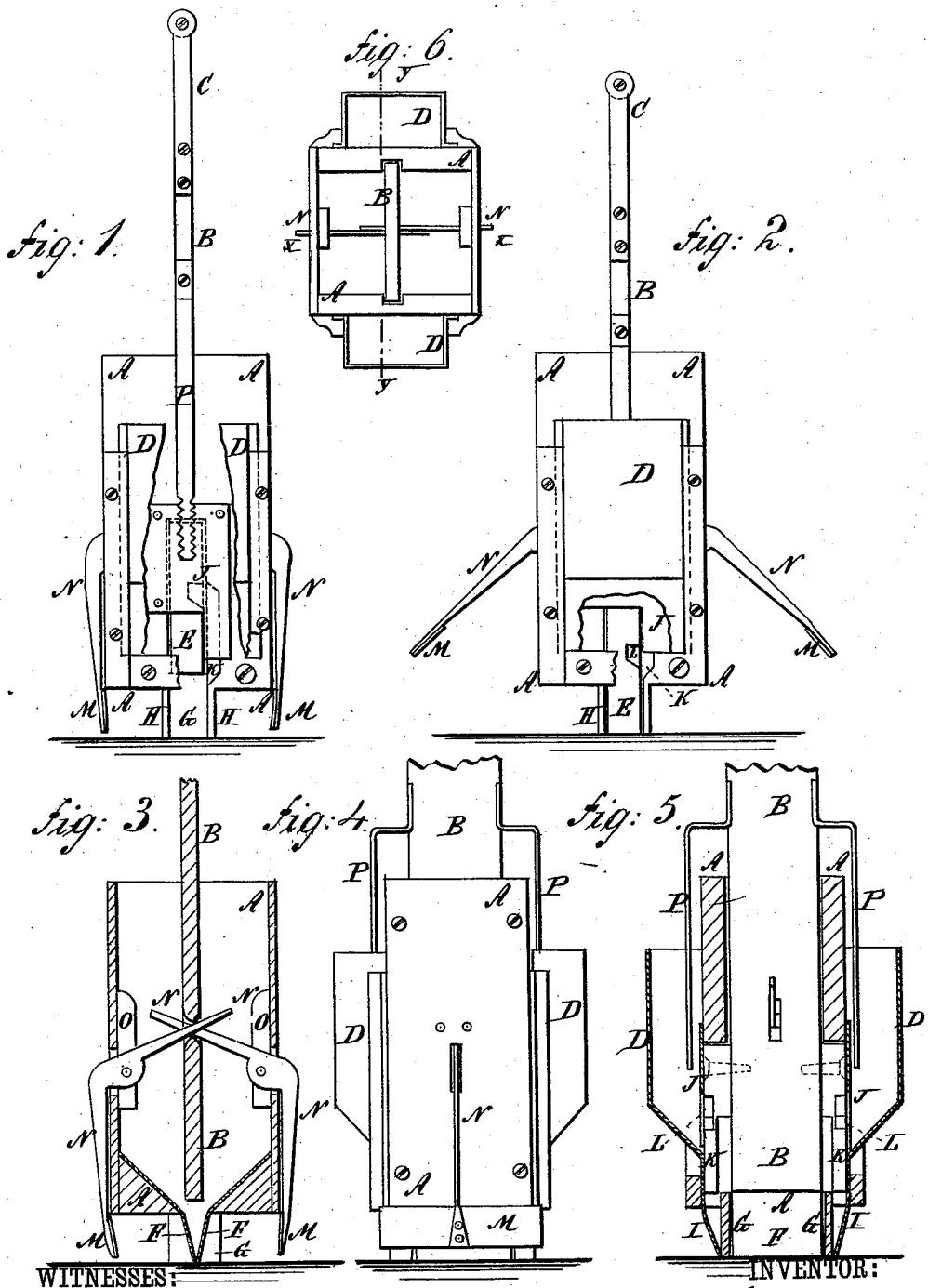

OREN STODDARD, OF BUSTI, NEW YORK.

COMBINED HAND SEED-PLANTER AND FERTILIZER-DISTRIBUTER.

SPECIFICATION forming part of Letters Patent No. 248,230, dated October 11, 1881.

Application filed February 16, 1881. (Model.)

*To all whom it may concern:*

Be it known that I, OREN STODDARD, of Busti, in the county of Chautauqua and State of New York, have invented a new Improvement in Combined Hand Seed-Planters and Fertilizer-Distributers, of which the following is a full, clear, and exact description.

Figure 1 is a side elevation of my improvement, shown with the followers raised and parts broken away. Fig. 2 is a side elevation of the same, shown with the follower pressed down and parts broken away. Fig. 3 is a sectional side elevation of the same, taken through the line $x\ x$, Fig. 6. Fig. 4 is a side elevation of the same turned one-quarter around. Fig. 5 is a sectional elevation of the same, taken through the line $y\ y$, Fig. 6. Fig. 6 is a plan view of the same.

The object of this invention is to plant the seed in a divided hill and deposit a fertilizer in the space between the parts of the hill.

A represents the central box, in which phosphate or other fine fertilizer is placed. In the inner surfaces of the opposite sides of the box A are formed grooves to receive the edges of the follower B, the upper end, C, of which is so formed as to serve as a handle, or has a handle, C, attached to it. Upon the opposite sides of the central box, A, are formed, or to them are attached, boxes D, to receive corn or other seed.

In the seed-boxes D are placed followers E, which slide up and down along grooves in the outer surfaces of the sides of the central box, A, and are connected with the side edges of the follower B by screws passing through slots in the said sides of the box A, so that the followers E will be carried up and down by and with the central follower, B. The bottom of the central box, A, is inclined from its sides toward its center, and in its center, directly below and corresponding in size with the lower end of the follower B, is formed a discharge-slot.
To the bottom of the central box, A, are attached two plates, F, of steel or other suitable elastic metal, which project through the slot in the said bottom and incline toward each other so that their lower edges meet at an acute angle a little below the bottom of the said box A. The plates F thus serve as a wedge to enter the soil. With this construction, as the follower B is drawn upward, the fertilizer passes below its lower end into the angular space between the elastic plates F, and as the said follower is pressed downward its lower end presses the plates F apart, forming an opening in the soil and forcing the said fertilizer between the said plates F into the soil.

To each side of the box A, opposite the ends of the slot in the bottom of the said box, are secured narrow downwardly-projecting rigid plates G, which may be downward projections of the middle parts of the sides of the box A. The plates G close the ends of the angular space between the elastic plates F, and have outwardly-projecting flanges H attached to or formed upon their side edges, to close the ends of the spaces between the said plates G and the inclined elastic plates I, attached to the bottoms of the boxes D, with their lower edges resting against the outer sides of the plates G.

The upper parts of the followers E and the grooves in which they work are covered by plates J, a part of which, at one side of the followers E, extends down to the bottom of the boxes D, so as to cover the channels K, formed in the side of the box A, along the said edges of the followers E.

In the edge of each of the followers E, adjacent to the channel K, is formed a recess, L, of such a size as to contain the desired amount of seed. The inner edge of the downwardly-projecting part of each plate J is bent inward to separate the channel K from the edge of the follower E. With this construction, as the followers E move downward they press back the elastic plates I and force the seed between the plates G I into the opening formed in the soil by pressing back the said plates I. The downward movement of the followers E brings the recesses L below the edge of the body of the plates J, so that the said recesses will be filled with seed. As the followers E move upward the plates J keep the seed in the recesses L until the said recesses come opposite the upper ends of the channels K, when the seed passes down through the channels K into the spaces between the plates and the elastic plates G I, ready to be forced out by the next downward movement of the followers E. By this construction the seed for each hill will be divided, and the fertilizer will be deposited in the space between the parts of the hill without being in contact with the seed, so that the seed will not be injured or killed by the fertilizer.

If desired, four channels, K, can be made for the seed, so that the seed for each hill will be divided into four parts.

M are the covering-plates, which are attached to the lower ends of the levers N. The levers N pass up along the sides of the box A, are bent inward, pass through holes in the said sides of the box A, are pivoted to supports O, attached to the box A, and their ends pass through holes in the follower B, as shown in Fig. 3. With this construction, when the follower B is drawn upward the covering-plates M are forced inward, forcing the soil into the openings in which the seed and fertilizer have been deposited, and covering the seed. As the follower B is forced downward the covering-plates M are forced outward, ready to cover the seed, when the said follower B is again drawn upward. With this construction the bottom of the box A comes in contact with the soil as the planter is forced downward, and thus serves as a stop, so that the seed will be planted to a uniform depth.

P are two bars, the upper ends of which are attached to the side edges of the follower B. The bars P are bent outward and then downward, project downward nearly to the bottoms of the side boxes, D, and have the edges of their lower parts notched or otherwise roughened, so that they will keep the seed stirred up, and will thus cause it to pass readily into the recesses L.

Having thus described my invention, what I claim as new, and desire to secure by Letters Patent, is—

1. In a planter, the combination, with the box A and follower B, of the levers N and covering-plates M, the ends of said levers passing in opposite directions through a hole in the follower B, substantially as and for the purpose specified.

2. In a planter, the combination, with the elastic plates F F, of the plates G G, having outwardly-projecting flanges H on their side edges, and the elastic plates I, as and for the purpose described.

OREN STODDARD.

Witnesses:
R. F. PICKARD,
RAY PICKARD.